(12) United States Patent
Knowlton

(10) Patent No.: US 7,810,250 B2
(45) Date of Patent: Oct. 12, 2010

(54) METHOD AND APPARATUS TO MARK OPPOSING SURFACES

(76) Inventor: Stephen Reid Knowlton, 2817 Tincup Cir., Boulder, CO (US) 80305

( * ) Notice: Subject to any disclaimer, the term of this patent is extended or adjusted under 35 U.S.C. 154(b) by 439 days.

(21) Appl. No.: 11/739,230

(22) Filed: Apr. 24, 2007

(65) Prior Publication Data

US 2008/0263882 A1    Oct. 30, 2008

(51) Int. Cl.
*G01B 5/14* (2006.01)

(52) U.S. Cl. .................. 33/528; 33/562; 33/DIG. 1

(58) Field of Classification Search .............. 33/528, 33/DIG. 10, 526, 562, 563, DIG. 1
See application file for complete search history.

(56) References Cited

U.S. PATENT DOCUMENTS

| | | | |
|---|---|---|---|
| 3,913,235 A * | 10/1975 | Tenneson et al. ............. 33/528 |
| 4,212,110 A | 7/1980 | Hill, Jr. | |
| 4,345,381 A | 8/1982 | Brislin | |
| 4,353,759 A * | 10/1982 | Stallings ................ 33/DIG. 10 |
| 4,372,050 A * | 2/1983 | Eisenhauer .................. 33/528 |
| 5,645,888 A | 7/1997 | Titterington et al. | |
| 5,747,738 A * | 5/1998 | Indoe .......................... 33/528 |
| 5,894,036 A | 4/1999 | Tylko | |
| 6,226,882 B1 | 5/2001 | Barr | |
| 6,470,585 B2 | 10/2002 | Barr | |
| 6,865,819 B2 | 3/2005 | Melittas | |
| 6,948,257 B1 | 9/2005 | Barr, Jr. | |
| 7,134,217 B2 | 11/2006 | Melittas | |
| 7,363,720 B2 * | 4/2008 | DiGavero et al. ............. 33/528 |
| 7,467,476 B2 * | 12/2008 | Digavero et al. ............. 33/528 |
| 2001/0027612 A1 | 10/2001 | Barr | |
| 2003/0126756 A1 | 7/2003 | Ackerman | |
| 2005/0043126 A1 | 2/2005 | Iggulden | |
| 2005/0178019 A1 | 8/2005 | Scarborough | |
| 2005/0198850 A1 | 9/2005 | Scarborough | |
| 2006/0000100 A1 | 1/2006 | Melittas | |
| 2006/0018700 A1 | 1/2006 | Mock | |
| 2008/0000097 A1 * | 1/2008 | DiGavero et al. ............. 33/528 |
| 2008/0155845 A1 * | 7/2008 | Digavero et al. ............. 33/528 |
| 2009/0277029 A1 * | 11/2009 | Guzallis ...................... 33/528 |
| 2010/0037475 A1 * | 2/2010 | Guzallis ...................... 33/528 |

* cited by examiner

*Primary Examiner*—Yaritza Guadalupe-McCall

(57) ABSTRACT

The technology of the present application provides a system and method for marking opposing surfaces of varying sizes, shapes, and materials. This system and method allow a user to transfer the outline or location of a relevant feature such as, for example, a fastener, utility outlet, architectural feature, or window or door, from one surface to another through the use of a transferable marking substance, thereby eliminating the need for complicated and limited fixtures or time consuming and often inaccurate manual measurements.

23 Claims, 7 Drawing Sheets

METHOD AND APPARATUS TO MARK OPPOSING SURFACES

BACKGROUND

1. Field

The technology of the present application relates generally to construction and building systems and methods, and more specifically, to systems and methods for marking the outline or location of an object on an opposing surface.

2. Background

Marking where to cut or drill construction materials is a common component of all building and construction. For example, marking and locating utility outlets or window and door openings on the blind side of drywall panels is a task required of virtually every building project. Manually measuring and marking where to locate these cuts, openings, or holes requires transposing measurements previously made from desired features to the blind side of a panel. This process is time consuming and inaccurate because points of reference are often irregular, uneven, and/or difficult to reach.

To address this problem, several devices exist for marking the outline or location of an object, such as an electrical outlet box, window or door, water or gas line, or similar features, on an opposing panel. That said, these devices are cumbersome and their applications are limited to marking outlines or locations of one or a few different types of objects on an opposing drywall panel. There is therefore a need in the art for a simple, accurate, and versatile method of marking the outline or location of nearly any object on a variety of opposing surfaces.

SUMMARY

Embodiments disclosed herein address the above stated needs by providing a system and method for marking opposing surfaces of various sizes, shapes, and materials through the use of a transferable marking substance. The foregoing, as well as other features, utilities, and advantages of the invention will be apparent from the following more particular description of a preferred embodiment of the invention as illustrated in the accompanying drawings.

DETAILED DESCRIPTION

The technology of the present application will be further explained with reference to FIGS. 1 through 7. It will be apparent to those skilled in the art that various changes in the methods and apparatuses disclosed herein may be made without departing from the scope of the invention, which is defined in the appended claims.

Figure 1:
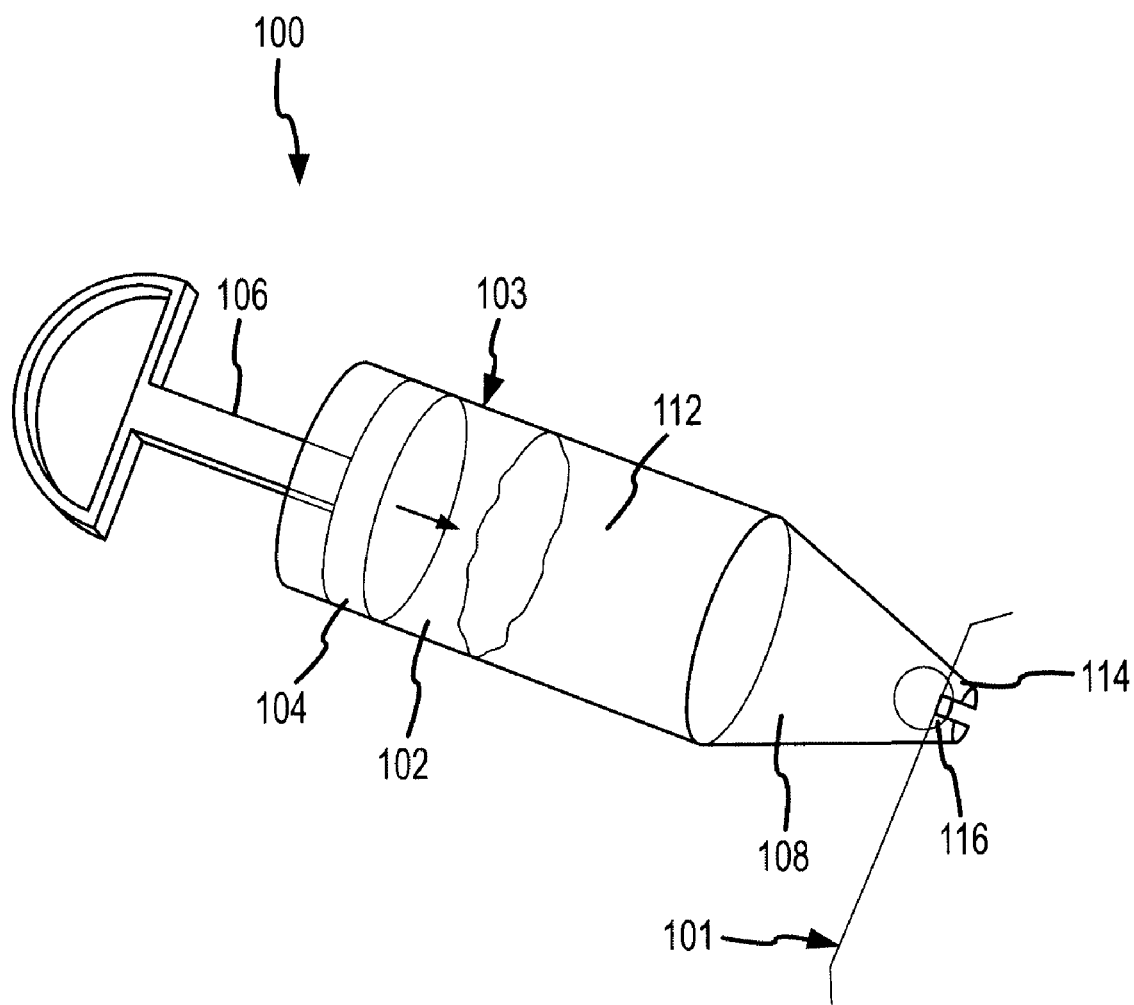
FIG. 1 shows a front perspective view of one embodiment of an apparatus for applying a marking substance to a template surface.

FIG. 1 shows a front perspective view of one embodiment of an apparatus 100 for applying a marking substance 112 to a template surface 101. The marking substance 112 may be transferred to an opposing blank surface (not shown), as explained further with reference to FIGS. 3 through 6. Transferring marking substance 112 from template surface 101 to the opposing blank surface allows the user to make accurate cuts in the newly marked blank surface.

In this embodiment, apparatus 100 may comprise a hollow tube 103 having a chamber 102, a plunger 104, a handle 106, and a tip 108. Chamber 102 may be filled with marking substance 112 formulated to imprint upon any surface pressed against it. In addition, tip 108 may feature an offset 114, which elevates an opening 116 of tip 108 above the template surface 101. Thus, apparatus 100 may dispense a bead of marking substance 112 with a consistent diameter, while at the same time, offset 114 may stay in constant contact with the template surface 101 to guide apparatus 100 and facilitate the accurate application of marking substance 112. Opening 116 of tip 108 may be sized to accommodate the necessary marks to the blank surface. For example, in one embodiment, opening 116 may be sized to dispense a bead of marking substance 112 that is approximately 1/16 inch in diameter. Of course, the size of opening 116 is largely a matter of design choice, environment of use, and viscosity of marking substance 112.

Generally, marking substance 112 may be a highly viscous liquid or semi-solid material that is impregnated with a visible ink, dye, or other coloring agent as is generally known in the art. Marking substance 112 may also be impregnated with a machine readable medium such as a radio-opaque substance, magnetic substance, metal filings, or other materials to facilitate the automated detection of marking substance 112. Preferably, marking substance 112 is washable, slow to dry, and does not spread or distort after application. Also, marking substance 112 should be compatible with most construction equipment, including drills, saws, nailers, routers, and other common building tools. Marking substance 112 may be formulated as generally known in the art or it may be purchased commercially.

Figure 2:
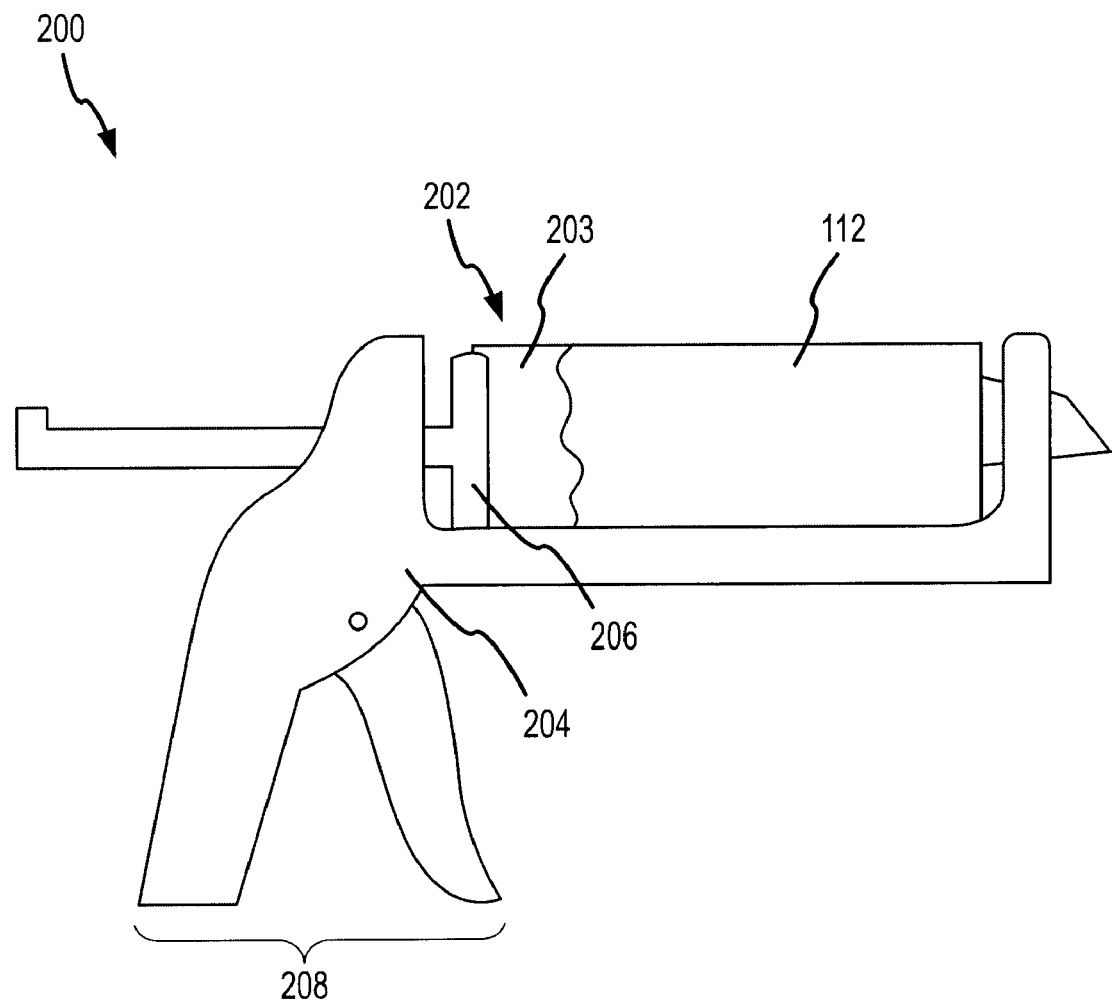
FIG. 2 shows a side plan view of another potential embodiment of an apparatus for applying a marking substance to a template surface.

FIG. 2 shows a side plan view of another embodiment of an apparatus for applying marking substance 112. Apparatus 200 may be used to discharge marking substance 112 from a cartridge 202 having a chamber 203. In this embodiment, apparatus 200 may comprise a shell 204 and a plunger 206 operably connected to a handle 208 through a ratchet system (not shown) configured as generally known in the art. Apparatus 200 may operate similarly to a caulking gun by causing plunger 206 to move through chamber 203 to discharge marking substance 112 from cartridge 202.

Figure 7:
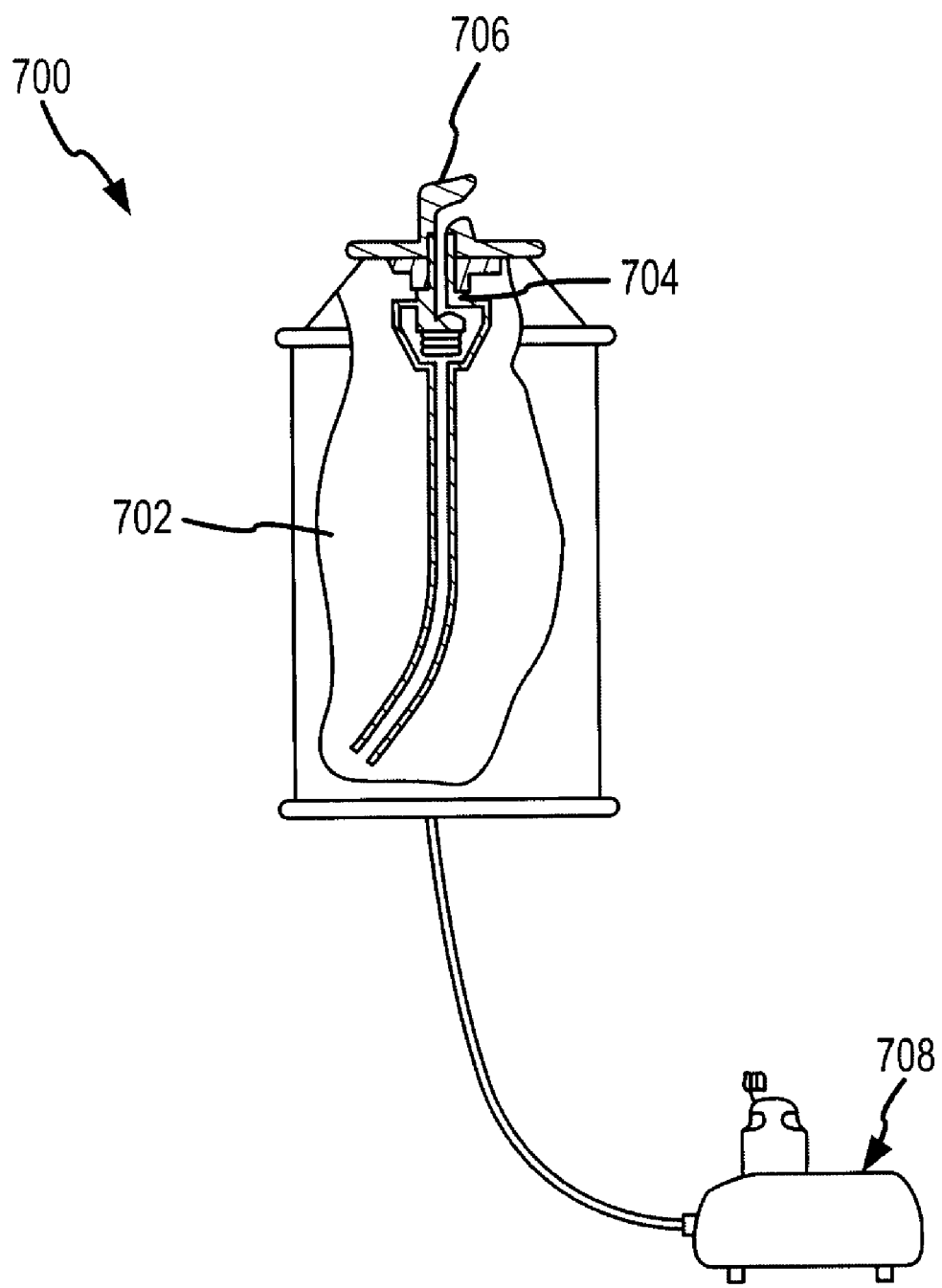
FIG. 7 illustrates a front plan view of another potential embodiment of an apparatus for applying a marking substance to a template surface.

FIG. 7 shows a front plan view of another embodiment of an apparatus for applying marking substance 112. Apparatus 700 may be used to discharge marking substance 112 from a pressurized container 702 having a valve 704 and a nozzle 706. When a user presses nozzle 706, valve 704 opens, allowing marking substance 112 to flow from the highly pressurized environment within the container to the outside air. Apparatus 700 may operate similarly to pressurized containers used to dispense products such as SILLY STRING®, EASY CHEESE®and others. Alternatively, container 702 may be connected to a pressure source 708, such as an air compressor or the like, instead of being pressurized.

While three embodiments of an apparatus for applying a marking substance have been described, one of ordinary skill in the art would readily understand that the apparatus can be practiced by other than the described embodiments, which are presented for the purpose of illustration rather than limitation.

Figure 3:
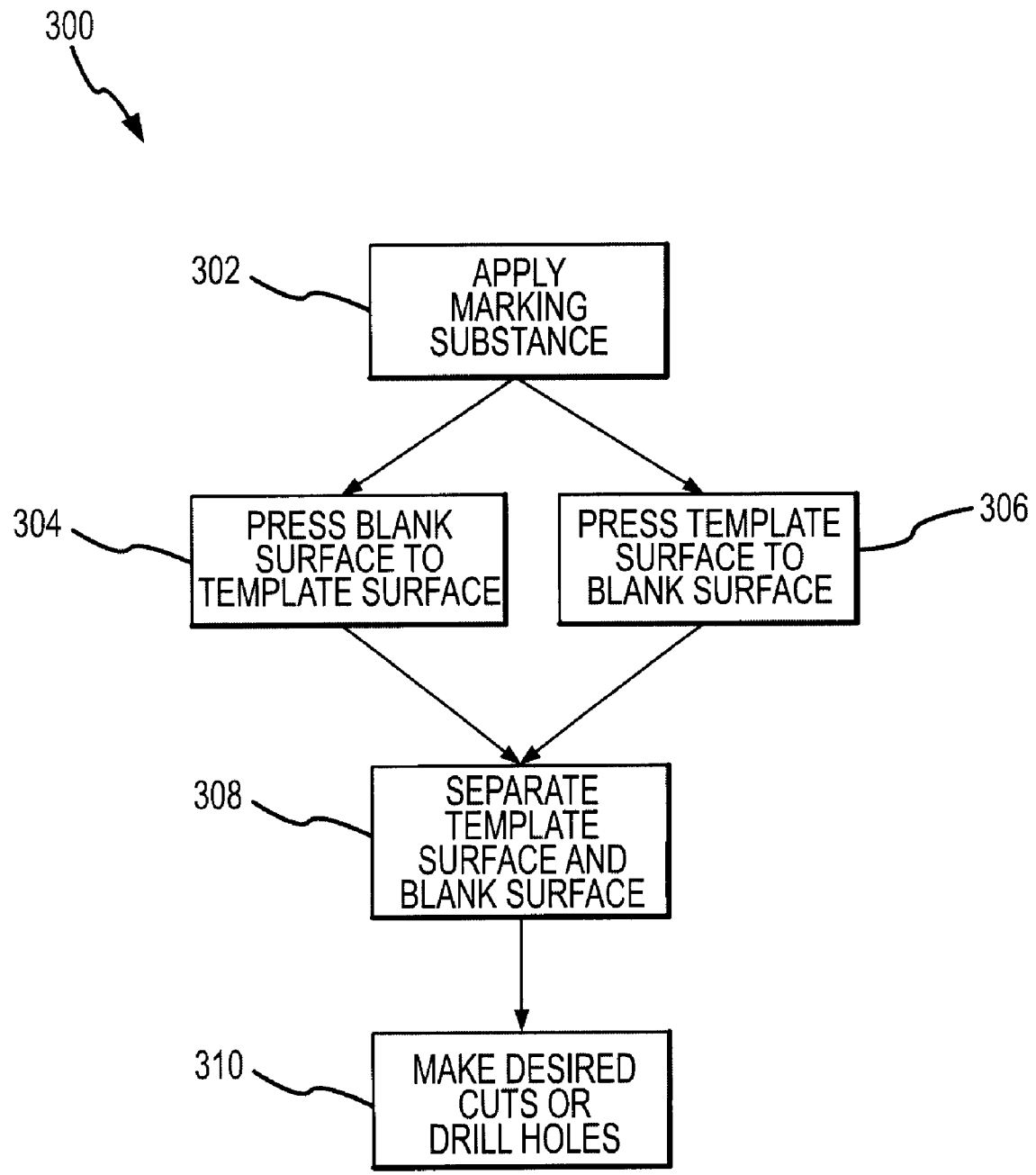
FIG. 3 shows a flowchart for a method of marking opposing surfaces.

FIG. 3 shows a flowchart for a method 300 of marking an opposing surface using, for example, apparatus 100, 200, 700 and marking substance 112 described above. Method 300 may be used to mark opposing surfaces having any size or shape and being formed of virtually any material. First, the user may apply a bead of marking substance to a template surface to be transferred to an opposing blank surface, step 302. This bead may comprise a continuous or discontinuous channel that outlines the perimeter of a construction feature such as an electrical box, piping outlet, architectural feature, window or door, or other similar feature to be transferred to an opposing blank surface. The bead may also be a single dot marking the location of a drill hole, wall stud, or otherwise. Once the marking substance has been applied, the user may either press the blank surface against the template surface, step 304, or press the template surface against the blank surface, step 306, to transfer the marking substance from the template surface to the blank surface. Pressing the template and blank surfaces together may be accomplished manually or through the use of equipment such as a press or other suitable device. After pressing the template and blank surfaces together, the user separates the surfaces, step 308. The outline or marks for accurate cutting are now reflected on the blank surface, and the user may cut or drill holes in the blank surface that accurately reflect the size, shape, and location of the corresponding template features, step 310. These cuts may be made manually or through the use of automated machinery.

Figure 4:
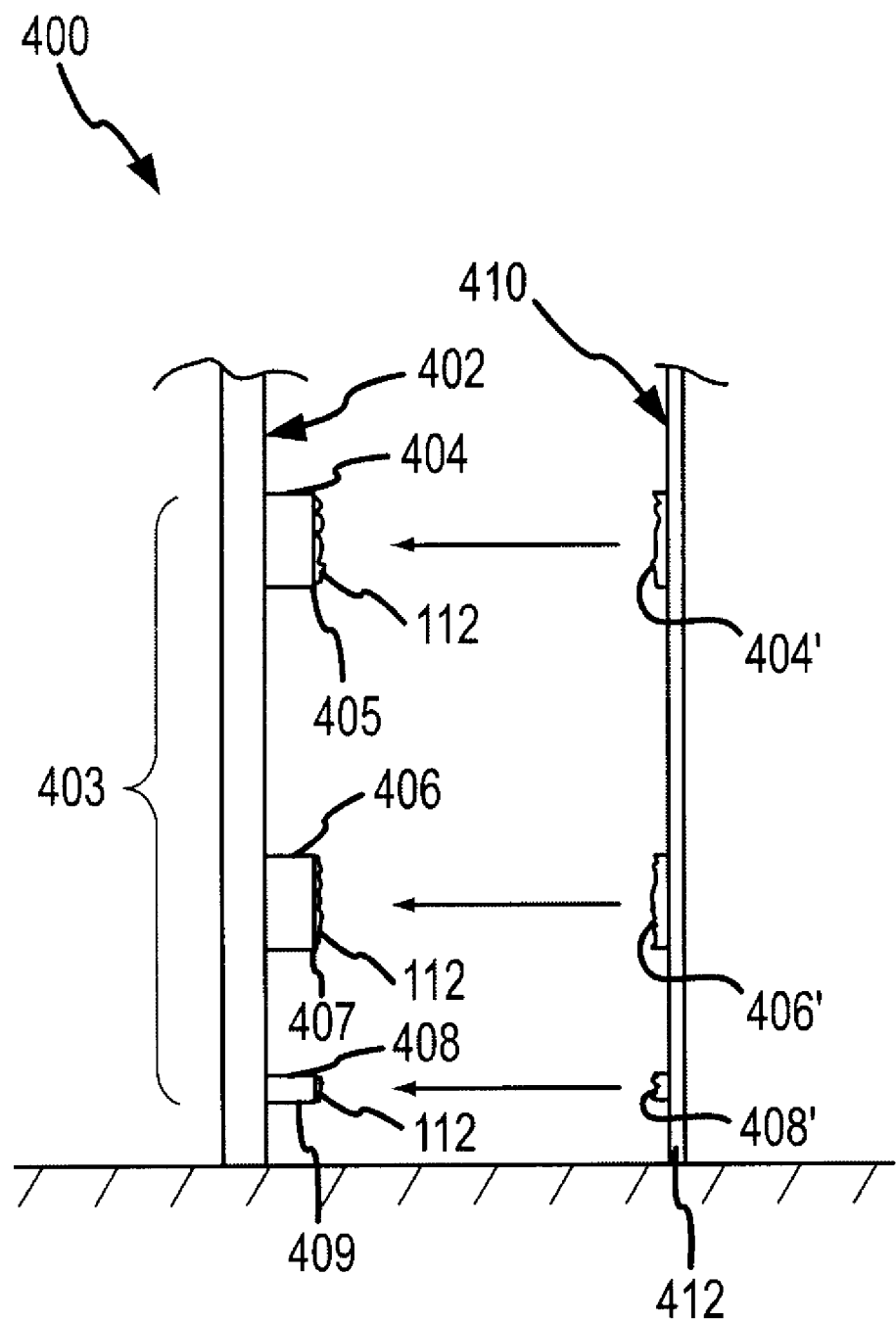
FIG. 4 illustrates an exploded view of one embodiment of a method of marking opposing surfaces.

FIG. 4 illustrates an exploded view of an exemplary embodiment of the above described method. In this embodiment, method 400 may be used to prepare drywall for mounting over features like electrical outlets, HVAC vents, gas and water pipes, and more. As shown in FIG. 4, surface 402 may comprise various construction features 403 such as, for example, light switch 404, electrical outlet 406, gas pipe 408, and similar features, to be reflected on a blind side 410 of a sheet of drywall 412. After applying marking substance 112 to outer perimeters 405, 407, 409 of features 404, 406, 408, the user may press blind side 410 against features 404, 406, 408, and outlines 404', 406', and 408' of features 404, 406, 408 will be transferred to blind side 410 where cut-outs are required. The user may then cut appropriately sized and accurately located holes in the drywall panel without the need for time consuming and error prone measurements.

Figure 5:
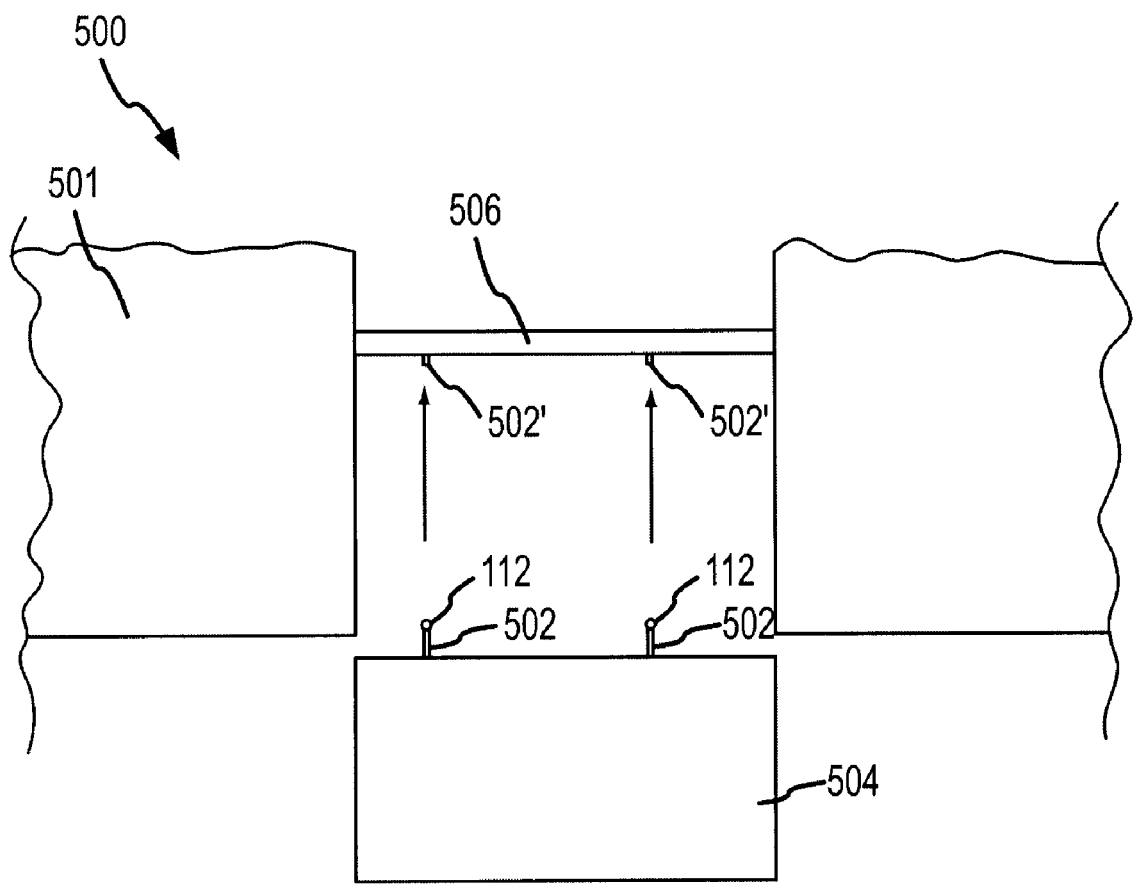
FIG. 5 illustrates an exploded view of another potential embodiment of a method of marking opposing surfaces.

FIG. 5 illustrates an exploded view of another exemplary embodiment of the above described method. Method 500 may be used to accurately locate drill holes for mounting appliances, lighting, equipment, and the like, under wall cabinets. For example, in this embodiment, a user may apply beads of marking substance 112 to the tips of mounting fasteners 502 before pressing an appliance 504 and attached mounting fasteners 502 against a cabinet base 506. Marking substance 112 is transferred from mounting fasteners 502 to cabinet base 506, allowing the user to set appliance 504 aside and drill mounting holes accurately on outlines 502'.

Figure 6:
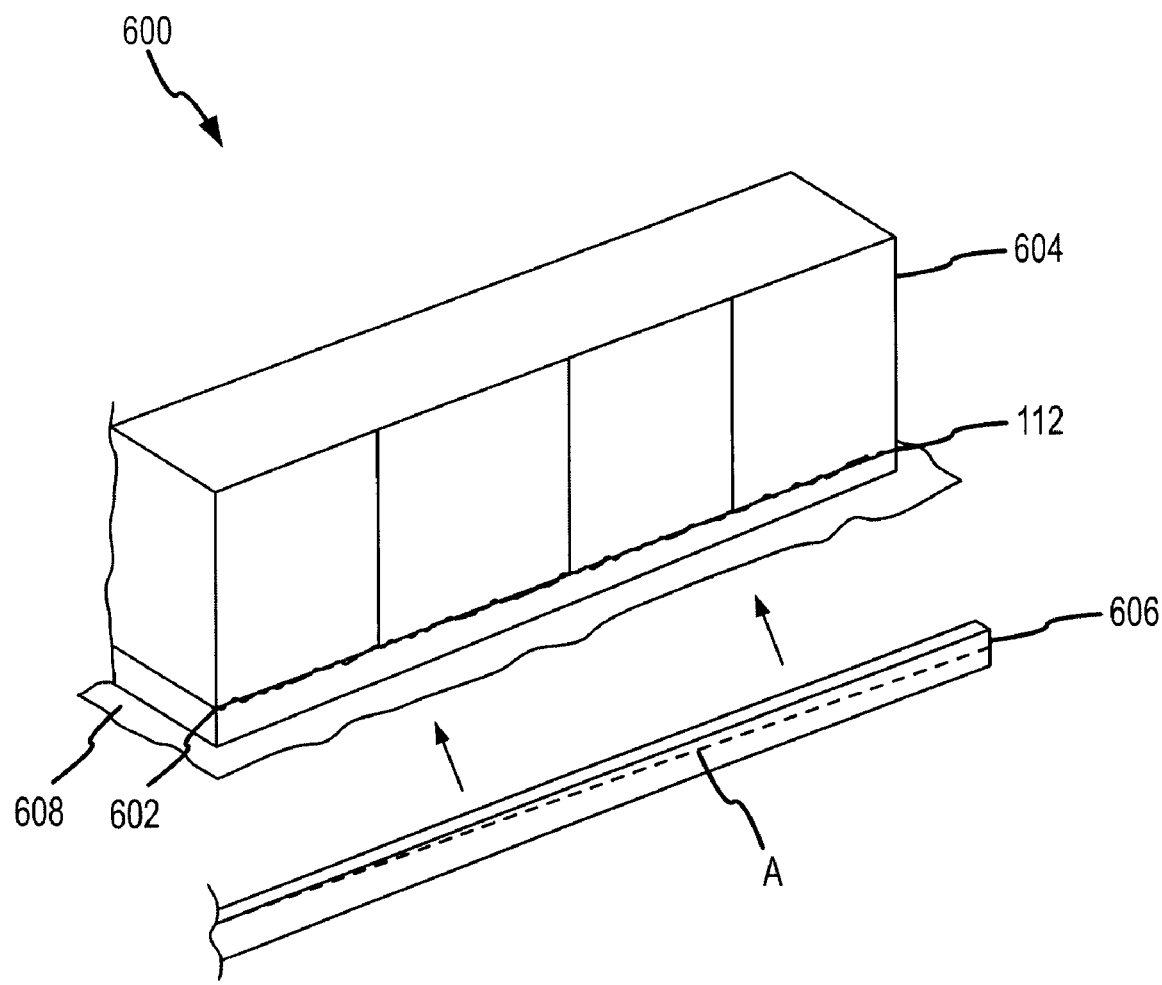
FIG. 6 illustrates an exploded view of another potential embodiment of a method of marking opposing surfaces.

FIG. 6 illustrates an exploded view of yet another exemplary embodiment of the above described method. Method 600 may be used to prepare toe kicks for installation under level base cabinets that sit above uneven floors. In this embodiment, a user may apply a bead of marking substance 112 along an outer bottom edge 602 of a base cabinet 604 and press a toe kick 606 against outer bottom edge 602. Marking substance 112 is transferred to toe kick 606, which can then be cut along a line A reflecting the slope or sag of the uneven floor 608.

While three specific embodiments of the disclosed method are provided to enable any person skilled in the art to make or use the present invention, one of ordinary skill in the art will readily understand that the present invention could be used in multiple environments, and that the specific examples described above are used for illustrative purposes only. For example, the method described above could also be used to hang wall art or mount window treatments or for a variety of other applications. Various modifications to the described embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of marking opposing surfaces, consisting the steps of:
    applying a bead of highly viscous, three-dimensional marking substance to a template surface along a perimeter of at least one feature on the template surface;
    pressing the template surface and the blank surface together, causing the bead of highly viscous, three-dimensional marking substance to contact the blank surface and outline the perimeter of the at least one feature; and
    separating the template surface and the blank surface, such that the outline of the perimeter of the at least one feature is transferred to the blank surface.

2. The method of claim 1, wherein the marking substance is applied discontinuously.

3. The method of claim 1, wherein pressing the blank surface and the template surface together causes the blank surface to be flush with the bead of highly viscous, three-dimensional marking substance on the template surface.

4. The method of claim 1, further consisting the step of cutting out the outline of the perimeter of the at least one feature from the blank surface.

5. A system of marking opposing surfaces, consisting of:
    an apparatus configured to apply a bead of highly viscous, three-dimensional marking substance to a template surface; and
    means for pressing the template surface and a blank surface together to transfer the bead of highly viscous, three-dimensional marking substance from the template surface to the blank surface.

6. The system of claim 5, wherein the marking substance is impregnated with a coloring agent.

7. The system of claim 5, wherein the marking substance is impregnated with a machine readable medium.

8. The system of claim 7, wherein the machine readable medium is selected from a group of mediums consisting of: radio opaque material, magnetic material, metal filings, and dyes.

9. The system of claim 5, wherein the bead of highly viscous, three-dimensional marking substance is non-permanent and washable.

10. The system of claim 5, wherein the marking substance is slow drying.

11. The system of claim 5, wherein the marking substance does not distort upon application.

12. The system of claim 5, wherein the apparatus consists of a container, a valve, and a nozzle.

13. The system of claim 5, wherein the apparatus consists of a container, and a tip.

14. The system of claims 13, wherein the apparatus further consists of an offset in the nozzle or tip to track along the edge of surfaces.

15. The system of claim 5, wherein the marking substance is at least one millimeter in diameter.

16. A system of marking opposing surfaces, consisting of:
   means for applying a bead of highly viscous, three-dimensional marking substance to a template surface; and
   means for pressing the template surface and a blank surface together to transfer the bead of highly viscous, three-dimensional marking substance from the template surface to the blank surface.

17. The system of claim 16, wherein the marking substance is impregnated with a coloring agent.

18. The system of claim 16, wherein the marking substance is impregnated with a machine readable medium.

19. The system of claim 18, wherein the machine readable medium is selected from a group of mediums consisting of: radio opaque material, magnetic material, metal filings, and dyes.

20. The system of claim 16, wherein the bead of highly viscous, three-dimensional marking substance is non-permanent and washable.

21. The system of claim 16, wherein the marking substance is slow drying.

22. The system of claim 16, wherein the marking substance does not distort upon application.

23. The system of claim 16, wherein the marking substance is at least one millimeter in diameter.

* * * * *